US00H002235H

(19) United States
(12) Statutory Invention Registration
Manounian

(10) Reg. No.: US H2235 H
(43) Published: Apr. 6, 2010

(54) LOCKING MECHANISM ON COLLAPSIBLE CRATE

(75) Inventor: Arthur Manounian, Glendale, CA (US)

(73) Assignee: API Kirk Containers, Commerce, CA (US)

(21) Appl. No.: 29/266,464

(22) Filed: Sep. 20, 2006

(51) LOC (9) Cl. ..... 03-01
(52) U.S. Cl. ..... D3/305
(58) Field of Classification Search ..... None
See application file for complete search history.

*Primary Examiner*—Michelle (Shelley) Clement
(74) *Attorney, Agent, or Firm*—Robert Berliner; Richard Tun

(57) CLAIM

The ornamental design for a locking mechanism on collapsible crate, as shown and described.

DESCRIPTION

FIG. 4 is an elevational view of the fully assembled crate;

FIG. 5 is a plan view of the top of the underside of the fully assembled crate; and FIG. 5A is an enlarged perspective view of the locking mechanism comprising a twist lock connecting the side walls of the crate, taken in one of the circles on the corners of the crate shown in FIG. 5.

1 Claim, 4 Drawing Sheets

Figures 1, 1A, 1B:
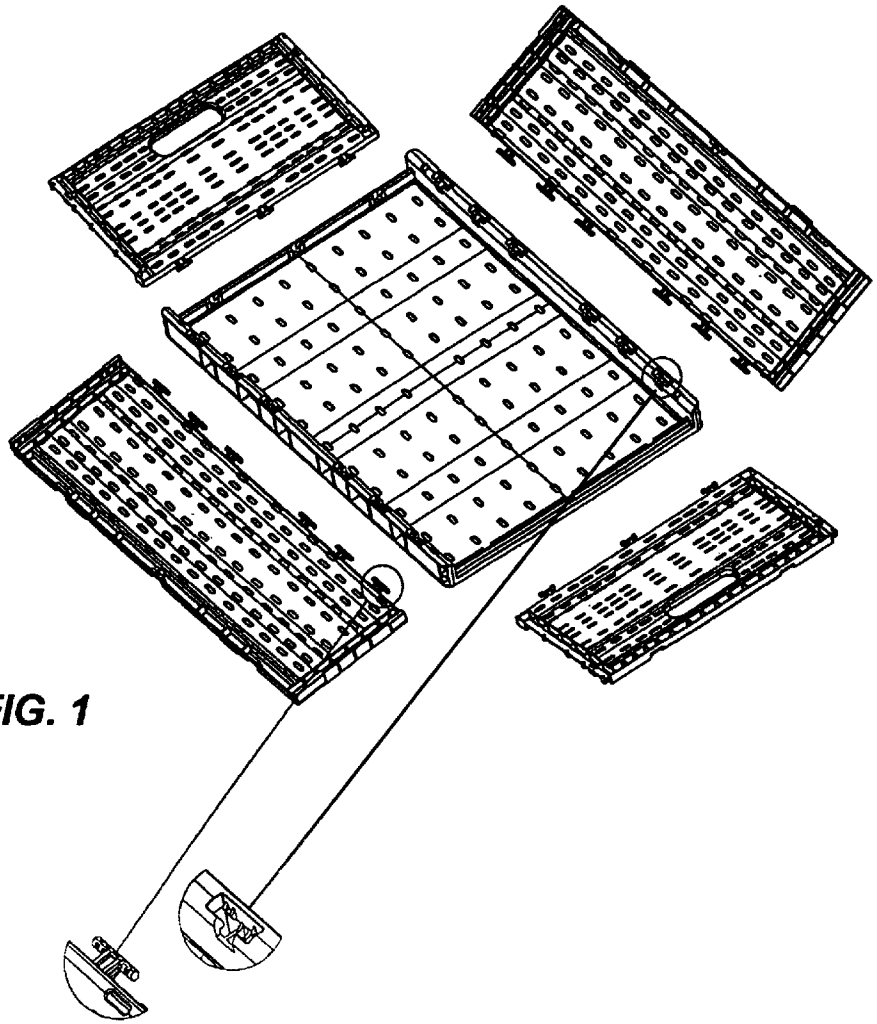
FIG. 1 is an exploded perspective view of a collapsible crate containing a locking mechanism of this invention.
FIG. 1A is an enlarged perspective view of a connector on a side wall of the collapsible crate, taken in the circle on the side wall of FIG. 1.
FIG. 1B is an enlarged perspective view of a connector receptor on a bottom wall of the locking mechanism on collapsible crate, taken in the circle on the bottom wall of FIG. 2 is a perspective view of the crate in a semi-collapsible state.
Figure 2:
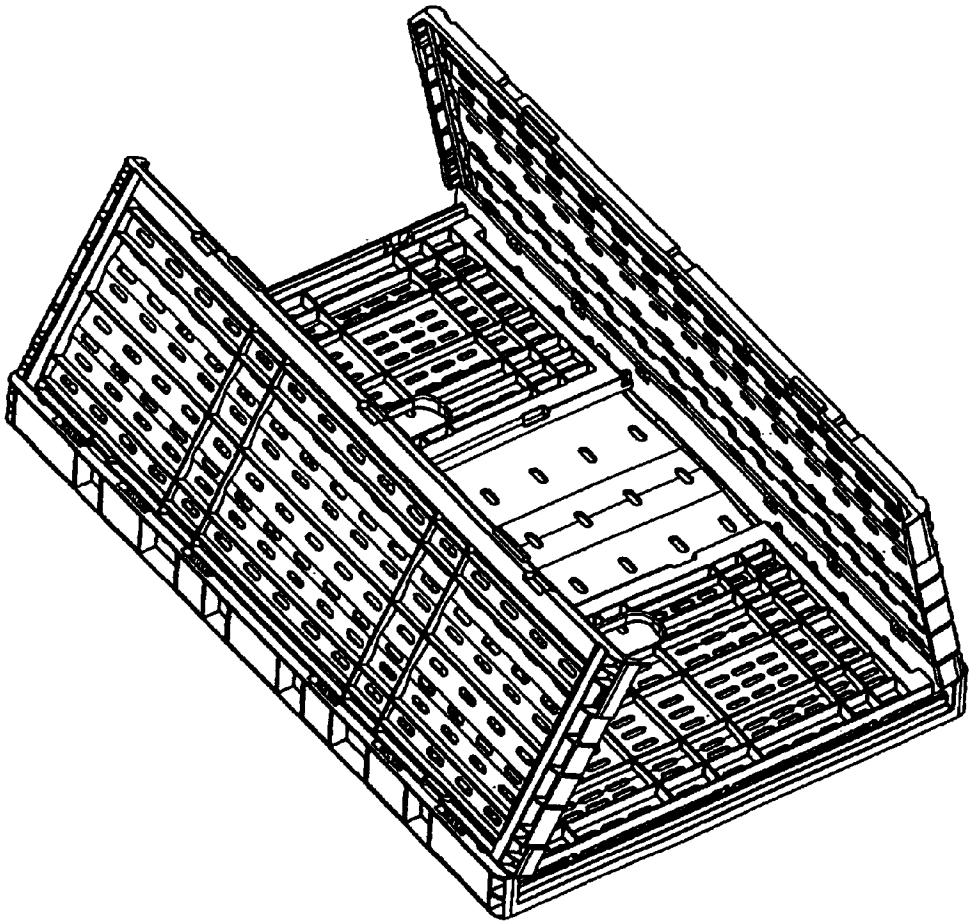
Figure 3:
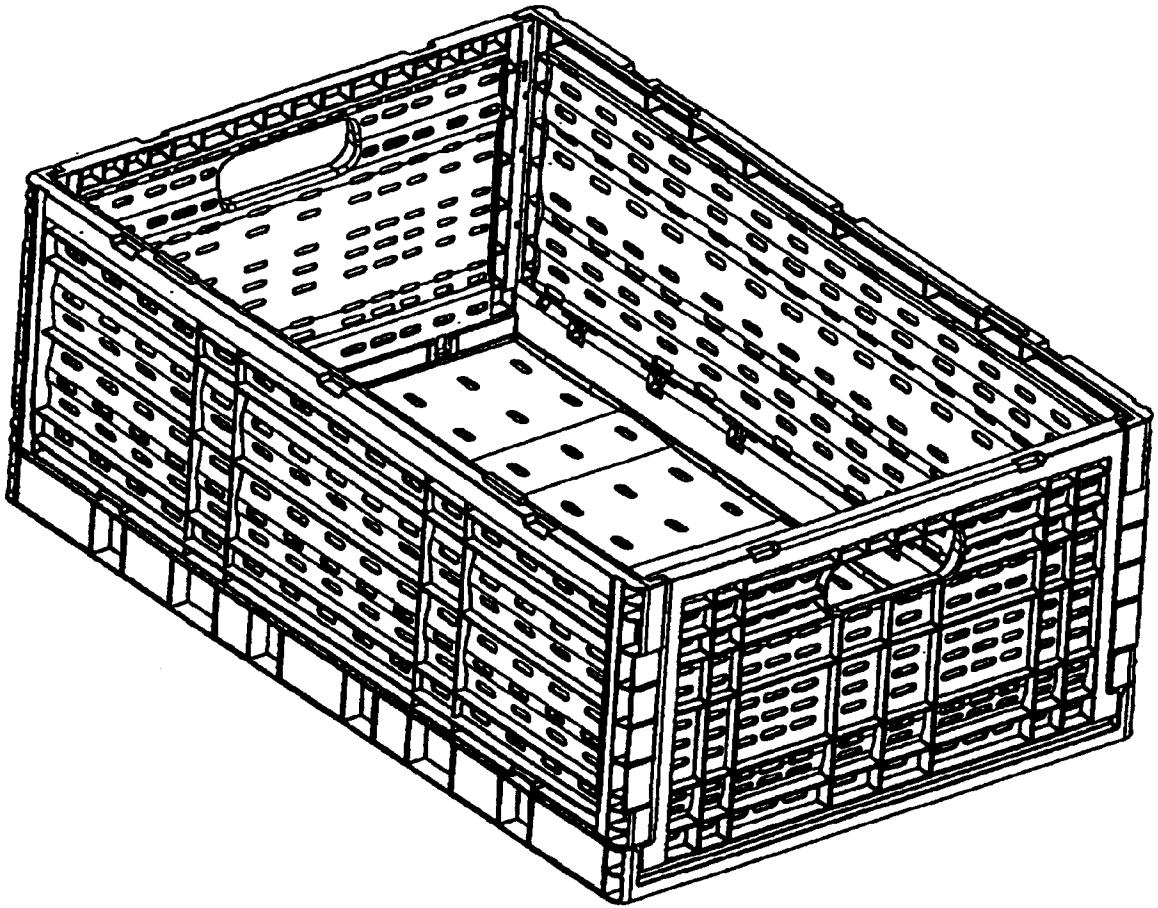
FIG. 3 is a perspective view of the crate in a fully assembled state.

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

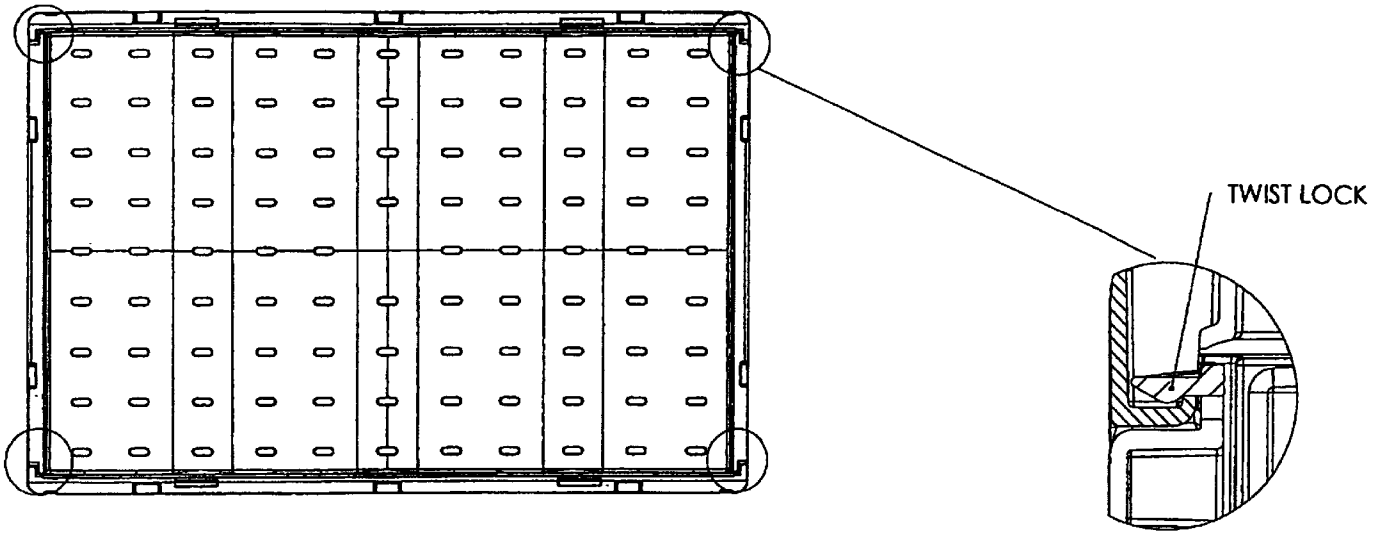
FIG. 5A
FIG. 5
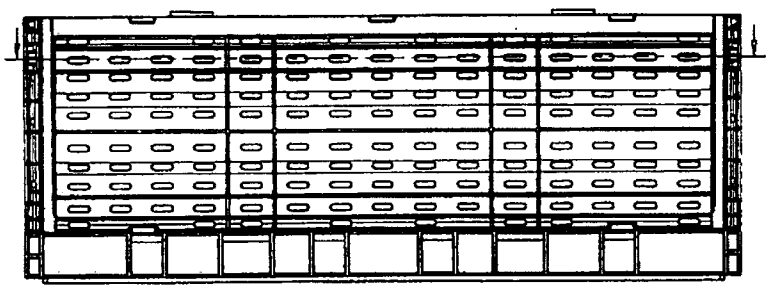
FIG. 4